(12) United States Patent
Garg et al.

(10) Patent No.: US 12,452,081 B2
(45) Date of Patent: Oct. 21, 2025

(54) SYSTEM AND METHOD FOR CRYPTOGRAPHIC DATA TRANSFER AND AUTHENTICATION IN A DISTRIBUTED NETWORK

(71) Applicant: BANK OF AMERICA CORPORATION, Charlotte, NC (US)

(72) Inventors: Saurabh Garg, Haryana (IN); Maneesh Sethia, Telangana, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 221 days.

(21) Appl. No.: 18/241,306

(22) Filed: Sep. 1, 2023

(65) Prior Publication Data

US 2025/0080359 A1    Mar. 6, 2025

(51) Int. Cl.
*H04L 9/32* (2006.01)
*H04L 9/08* (2006.01)
*H04L 9/14* (2006.01)

(52) U.S. Cl.
CPC .......... *H04L 9/3247* (2013.01); *H04L 9/0819* (2013.01); *H04L 9/0861* (2013.01); *H04L 9/14* (2013.01)

(58) Field of Classification Search
CPC .................................................... H04L 9/3247
See application file for complete search history.

(56) References Cited

U.S. PATENT DOCUMENTS

| | | |
|---|---|---|
| 9,208,032 B1 | 12/2015 | McAlister |
| 10,474,547 B2 | 11/2019 | McAlister |
| 10,484,423 B2 | 11/2019 | Kinder |
| 10,678,919 B2 | 6/2020 | Kinder |
| 10,713,360 B2 | 7/2020 | Kinder |
| 10,719,554 B1 | 7/2020 | Davis |
| 10,885,023 B1 | 1/2021 | Gupta |
| 11,210,184 B1 | 12/2021 | Gupta |
| 11,397,711 B1 | 7/2022 | Krishnamurthy |
| 11,481,397 B1 | 10/2022 | Galvin |
| 11,586,608 B1 | 2/2023 | Kansal |
| 11,868,359 B2 | 1/2024 | Saxena |
| 11,876,779 B2 | 1/2024 | Konda |
| 2006/0282886 A1 | 12/2006 | Gaug |
| 2013/0263233 A1 | 10/2013 | Dinha |
| 2020/0053079 A1* | 2/2020 | Bendersky ............... H04L 9/14 |
| 2023/0208710 A1 | 6/2023 | Tal |
| 2025/0080329 A1* | 3/2025 | Bruno ....................... H04L 9/14 |
| 2025/0080359 A1* | 3/2025 | Garg ........................ H04L 9/14 |

\* cited by examiner

*Primary Examiner* — Simon P Kanaan

(74) *Attorney, Agent, or Firm* — Moore & Van Allen PLLC; Andrew T. Wood

(57) ABSTRACT

Systems, computer program products, and methods are described herein for cryptographic data transfer and authentication in a distributed network. The present invention is configured to receive credentials on an interface of an endpoint device, receive a request from the endpoint device to access a portal, authenticate the credentials via an authentication engine, receive specifications, wherein the specifications are input into the interface of the endpoint device, select, via a configuration engine comprising pre-existing configurations in a configuration database of a first storage device, a selected pre-existing configuration, determine a verification of the selected pre-existing configuration, and access the portal.

20 Claims, 10 Drawing Sheets

```
                                                          300A

┌─────────────────────────────────────────────────────────────────┐
│  RECEIVE REQUEST DATA FOR A REQUEST TO TRANSFER DATA FROM A FIRST │
│         ENDPOINT DEVICE TO A SECOND ENDPOINT DEVICE              │
│                            302                                   │
└─────────────────────────────────────────────────────────────────┘
                              │
                              ▼
┌─────────────────────────────────────────────────────────────────┐
│  GENERATE A FIRST SECRET KEY AND A SECOND SECRET KEY VIA AN ARTIFICIAL │
│  NEURAL NETWORK ENGINE, WHEREIN THE FIRST SECRET KEY AND THE SECOND │
│                   SECRET KEY ARE SYMMETRICAL                     │
│                            304                                   │
└─────────────────────────────────────────────────────────────────┘
                              │
                              ▼
┌─────────────────────────────────────────────────────────────────┐
│   DISTRIBUTE THE FIRST SECRET KEY AND THE SECOND SECRET KEY VIA A CLOUD │
│    SERVER, WHEREIN THE CLOUD SERVER ENCRYPTS THE FIRST AND SECOND │
│       SECRET KEYS WITH CORRESPONDING FIRST AND SECOND PUBLIC KEYS │
│                            306                                   │
└─────────────────────────────────────────────────────────────────┘
                              │
                              ▼
┌─────────────────────────────────────────────────────────────────┐
│     STORE THE ENCRYPTED FIRST SECRET KEY AND THE ENCRYPTED SECOND │
│                SECRET KEY IN THE CLOUD SERVER                    │
│                            308                                   │
└─────────────────────────────────────────────────────────────────┘
                              │
                              ▼
┌─────────────────────────────────────────────────────────────────┐
│  TRANSMIT, AS A RESULT OF A REQUEST FROM THE SECOND ENDPOINT DEVICE, │
│    THE SECOND SECRET KEY TO THE SECOND ENDPOINT DEVICE, WHEREIN THE │
│  SECOND ENDPOINT DEVICE DECRYPTS THE SECOND SECRET KEY VIA APPLYING A │
│                       SECOND PRIVATE KEY                         │
│                            310                                   │
└─────────────────────────────────────────────────────────────────┘
                              │
                              ▼
┌─────────────────────────────────────────────────────────────────┐
│  TRANSMIT THE ENCRYPTED FIRST SECRET KEY TO THE FIRST ENDPOINT DEVICE, │
│   WHEREIN THE FIRST ENDPOINT DEVICE OBTAINS A DECRYPTED FIRST SECRET │
│   KEY FROM THE ENCRYPTED FIRST SECRET KEY BY APPLYING A FIRST PRIVATE │
│              KEY ASSOCIATED WITH THE FIRST PUBLIC KEY            │
│                            312                                   │
└─────────────────────────────────────────────────────────────────┘
                              │
                              ▼
┌─────────────────────────────────────────────────────────────────┐
│    TRANSMIT THE ENCRYPTED SECOND SECRET KEY TO THE FIRST ENDPOINT │
│    DEVICE, WHEREIN THE SECOND ENDPOINT DEVICE OBTAINS A DECRYPTED │
│  SECOND SECRET KEY FROM THE ENCRYPTED SECOND SECRET KEY BY APPLYING │
│     A SECOND PRIVATE KEY ASSOCIATED WITH THE SECOND PUBLIC KEY   │
│                            314                                   │
└─────────────────────────────────────────────────────────────────┘
```

FIG. 3A

```
┌─────────────────────────────────────────────────────────────────┐
│ ORGANIZE THE DATA, AS A RESULT OF VALIDATING THE AUTHENTICITY   │
│                OF THE REQUEST, IN A MERKLE TREE                 │
│                              324                                │
└─────────────────────────────────────────────────────────────────┘
                                 ↓
┌─────────────────────────────────────────────────────────────────┐
│         DETERMINE A FIRST MERKLE TREE ROOT HASH OF THE DATA     │
│                              326                                │
└─────────────────────────────────────────────────────────────────┘
                                 ↓
┌─────────────────────────────────────────────────────────────────┐
│         GENERATE A BLOCK COMPRISING THE FIRST MERKLE TREE ROOT HASH │
│                              328                                │
└─────────────────────────────────────────────────────────────────┘
                                 ↓
┌─────────────────────────────────────────────────────────────────┐
│            SECURE THE BLOCK USING THE DECRYPTED FIRST SECRET KEY │
│                              330                                │
└─────────────────────────────────────────────────────────────────┘
                                 ↓
┌─────────────────────────────────────────────────────────────────┐
│         BROADCAST THE BLOCK TO THE NODES OF THE DISTRIBUTED NETWORK │
│                              332                                │
└─────────────────────────────────────────────────────────────────┘
                                 ↓
┌─────────────────────────────────────────────────────────────────┐
│    VALIDATE THE BLOCK AT THE SECOND ENDPOINT DEVICE OF THE      │
│                       DISTRIBUTED NETWORK                       │
│                              334                                │
└─────────────────────────────────────────────────────────────────┘
                                 ↓
┌─────────────────────────────────────────────────────────────────┐
│  DECRYPT, IN RESPONSE TO VALIDATING THE BLOCK, THE DATA OF THE  │
│         BLOCK USING THE DECRYPTED SECOND SECRET KEY             │
│                              336                                │
└─────────────────────────────────────────────────────────────────┘
```

FIG. 3C

SYSTEM AND METHOD FOR CRYPTOGRAPHIC DATA TRANSFER AND AUTHENTICATION IN A DISTRIBUTED NETWORK

FIELD OF THE INVENTION

The present invention embraces a system for cryptographic data transfer and authentication in a distributed network.

BACKGROUND

In the modern entity technology landscape, data shared via digital communication over a network between parties has become increasingly prevalent, and the transmission of keys is generally accomplished using methods such as public cryptographic key encryption and the implementation of various algorithms. However, these approaches pose security vulnerabilities and may present opportunities to malicious actors. The compromise of a cryptographic key exposes the security infrastructure of an entity and may allow malicious actors to pose as users with privileges not otherwise possessed by the malicious actors. If a weak encryption algorithm is used to generate a key, then malicious actors may easily determine the value of the encryption key. Moreover, if a key is generated in an insecure location, the key could be compromised by a malicious actor at the instant the key is generated or transmitted, even if the keys are distributed via a seemingly secure connection. Accordingly, there is a need for a system and method for cryptographic data transfer and authentication in a distributed network.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for selective data routing in a distributed network via data throughput analysis in a distributed ledger network is presented. The system may include a processing device, and a non-transitory storage device including instructions that, when executed by the processing device, causes the processing device to perform the steps of: receive request data for a request to transfer data from a first endpoint device to a second endpoint device, generate a first secret key and a second secret key via an artificial neural network engine, wherein the first secret key and the second secret key are symmetrical, distribute the first secret key and the second secret key via a cloud server, wherein the cloud server encrypts the first secret key with a first public key associated with the first endpoint device to generate an encrypted first secret key, and wherein the cloud server encrypts the second secret key with a second public key associated with the second endpoint device to generate an encrypted second secret key, wherein the first endpoint device and the second endpoint device are nodes of a distributed network, store the encrypted first secret key and the encrypted second secret key in the cloud server, transmit, in response to a request from the first endpoint device, the encrypted first secret key to the first endpoint device, wherein the first endpoint device obtains a decrypted first secret key from the encrypted first secret key by applying a first private key associated with the first public key, and transmit, in response to a request from the second endpoint device, the encrypted second secret key to the first endpoint device, wherein the second endpoint device obtains a decrypted second secret key from the encrypted second secret key by applying a second private key associated with the second public key.

In some embodiments, the instructions further cause the processing device to generate hashed request data by applying a hash algorithm to the request data, apply a digital signature comprising the decrypted first secret key to the hashed request data, transmit a notification of the request to the second endpoint device, and validate, at the second endpoint device, an authenticity of the request by applying the decrypted second secret key to the digital signature.

In some embodiments, the instructions further cause the processing device to organize the data, as a result of validating the authenticity of the request, in a Merkle tree, determine a first Merkle tree root hash of the data, generate a block comprising the first Merkle tree root hash, secure the block using the decrypted first secret key, broadcast the block to the nodes of the distributed network, validate the block at the second endpoint device of the distributed network, and decrypt, in response to validating the block, the data of the block using the decrypted second secret key.

In some embodiments, generating the first secret key and the second secret key via the artificial neural network engine may include the artificial neural network engine outputting the first secret key and the second secret key based on a predetermined encryption level.

In some embodiments, generating the first secret key and the second secret key via the artificial neural network engine may include the artificial neural network engine outputting the first secret key and the second secret key based on a hash index of a previous secret key.

In some embodiments, validating the block may include the second endpoint device determining a second Merkle tree root hash of the data, and wherein the block is verified if the second Merkle tree root hash is identical to the first Merkle tree root hash.

In some embodiments, the distributed network may include an optical fiber network. In another aspect, a computer program product for cryptographic data transfer and authentication in a distributed network is presented. The computer program product may include a non-transitory computer-readable medium including code causing an apparatus to receive request data for a request to transfer data from a first endpoint device to a second endpoint device, generate a first secret key and a second secret key via an artificial neural network engine, wherein the first secret key and the second secret key are symmetrical, distribute the first secret key and the second secret key via a cloud server, wherein the cloud server encrypts the first secret key with a first public key associated with the first endpoint device to generate an encrypted first secret key, and wherein the cloud server encrypts the second secret key with a second public key associated with the second endpoint device to generate an encrypted second secret key, wherein the first endpoint device and the second endpoint device are nodes of a distributed network, store the encrypted first secret key and the encrypted second secret key in the cloud server, transmit, in response to a request from the first endpoint device, the encrypted first secret key to the first endpoint device, wherein the first endpoint device obtains a decrypted first secret key from the encrypted first secret key by applying a first private key associated with the first public key, and transmit, in response to a request from the second endpoint device, the encrypted second secret key to the first endpoint device, wherein the second endpoint device obtains a decrypted second secret key from the encrypted second secret key by applying a second private key associated with the second public key.

In some embodiments, the code further causes the apparatus to generate hashed request data by applying a hash algorithm to the request data, apply a digital signature comprising the decrypted first secret key to the hashed request data, transmit a notification of the request to the second endpoint device, and validate, at the second endpoint device, an authenticity of the request by applying the decrypted second secret key to the digital signature.

In some embodiments, the code further causes the apparatus to organize the data, as a result of validating the authenticity of the request, in a Merkle tree, determine a first Merkle tree root hash of the data, generate a block comprising the first Merkle tree root hash, secure the block using the decrypted first secret key, broadcast the block to the nodes of the distributed network, validate the block at the second endpoint device of the distributed network, wherein validating the block may include the second endpoint device determining a second Merkle tree root hash of the data, and wherein the block is verified if the second Merkle tree root hash is identical to the first Merkle tree root hash, and decrypt, in response to validating the block, the data of the block using the decrypted second secret key.

In some embodiments, generating the first secret key and the second secret key via the artificial neural network engine may include the artificial neural network engine outputting the first secret key and the second secret key based on a predetermined encryption level.

In some embodiments, generating the first secret key and the second secret key via the artificial neural network engine may include the artificial neural network engine outputting the first secret key and the second secret key based on a hash index of a previous secret key.

In some embodiments, validating the block may include the second endpoint device determining a second Merkle tree root hash of the data, and wherein the block is verified if the second Merkle tree root hash is identical to the first Merkle tree root hash.

In some embodiments, the distributed network may include an optical fiber network.

In yet another aspect, a method for cryptographic data transfer and authentication in a distributed network is presented. The method may include receiving request data for a request to transfer data from a first endpoint device to a second endpoint device, generating a first secret key and a second secret key via an artificial neural network engine, wherein the first secret key and the second secret key are symmetrical, distributing the first secret key and the second secret key via a cloud server, wherein the cloud server encrypts the first secret key with a first public key associated with the first endpoint device to generate an encrypted first secret key, and wherein the cloud server encrypts the second secret key with a second public key associated with the second endpoint device to generate an encrypted second secret key, wherein the first endpoint device and the second endpoint device are nodes of a distributed network, storing the encrypted first secret key and the encrypted second secret key in the cloud server, transmitting, in response to a request from the first endpoint device, the encrypted first secret key to the first endpoint device, wherein the first endpoint device obtains a decrypted first secret key from the encrypted first secret key by applying a first private key associated with the first public key, and transmitting, in response to a request from the second endpoint device, the encrypted second secret key to the first endpoint device, wherein the second endpoint device obtains a decrypted second secret key from the encrypted second secret key by applying a second private key associated with the second public key.

In some embodiments, the method further may include generating hashed request data by applying a hash algorithm to the request data, applying a digital signature comprising the decrypted first secret key to the hashed request data, transmitting a notification of the request to the second endpoint device, and validating, at the second endpoint device, an authenticity of the request by applying the decrypted second secret key to the digital signature.

In some embodiments, the method further may include organizing the data, as a result of validating the authenticity of the request, in a Merkle tree, determining a first Merkle tree root hash of the data, generating a block comprising the first Merkle tree root hash, securing the block using the decrypted first secret key, broadcasting the block to the nodes of the distributed network, validating the block at the second endpoint device of the distributed network, wherein validating the block may include the second endpoint device determining a second Merkle tree root hash of the data, and wherein the block is verified if the second Merkle tree root hash is identical to the first Merkle tree root hash, and decrypting, in response to validating the block, the data of the block using the decrypted second secret key.

In some embodiments, generating the first secret key and the second secret key via the artificial neural network engine may include the artificial neural network engine outputting the first secret key and the second secret key based on a predetermined encryption level.

In some embodiments, generating the first secret key and the second secret key via the artificial neural network engine may include the artificial neural network engine outputting the first secret key and the second secret key based on a hash index of a previous secret key.

In some embodiments, validating the block may include the second endpoint device determining a second Merkle tree root hash of the data, and wherein the block is verified if the second Merkle tree root hash is identical to the first Merkle tree root hash.

In some embodiments, the distributed network may include an optical fiber network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
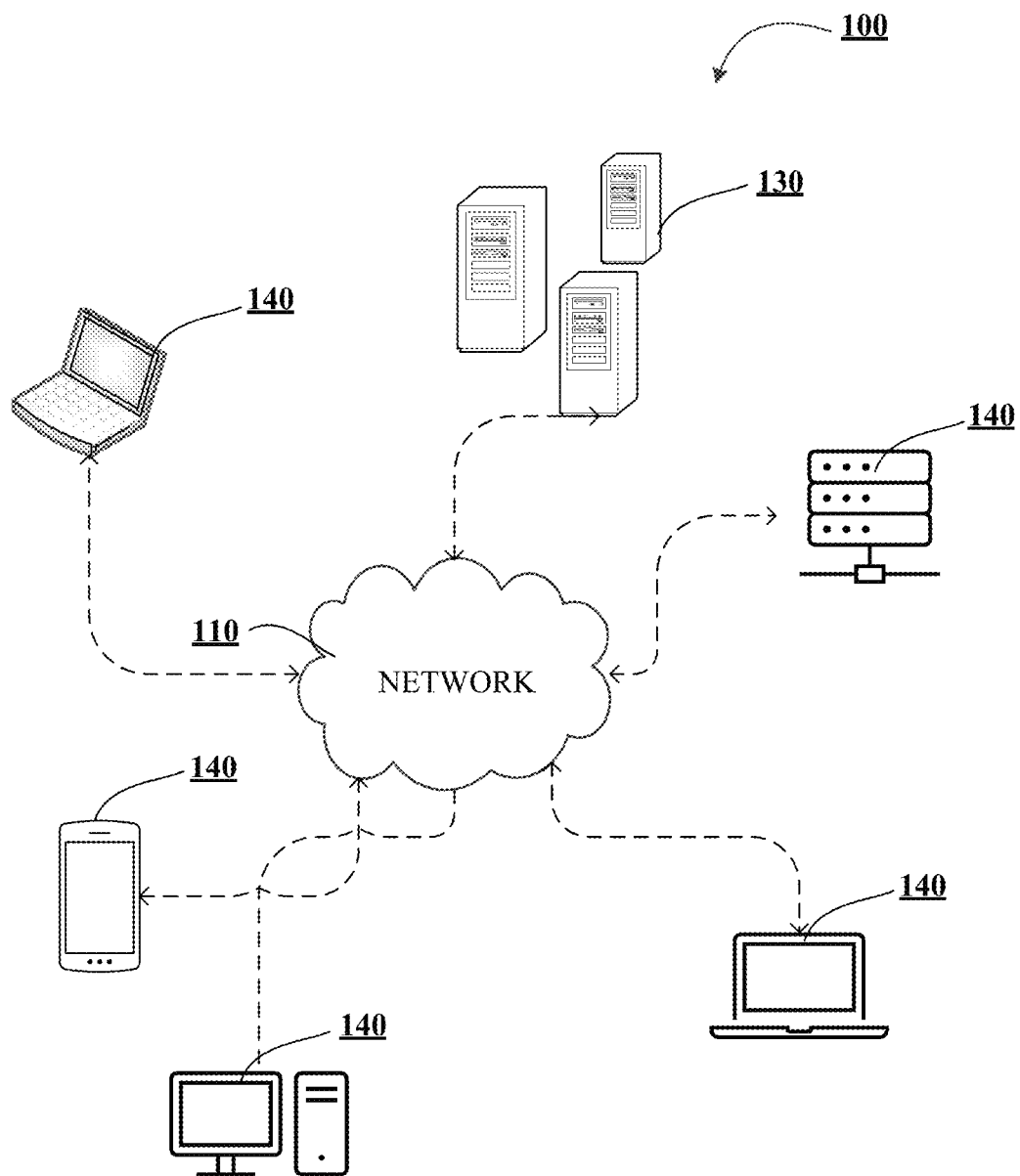
Figure 1B:
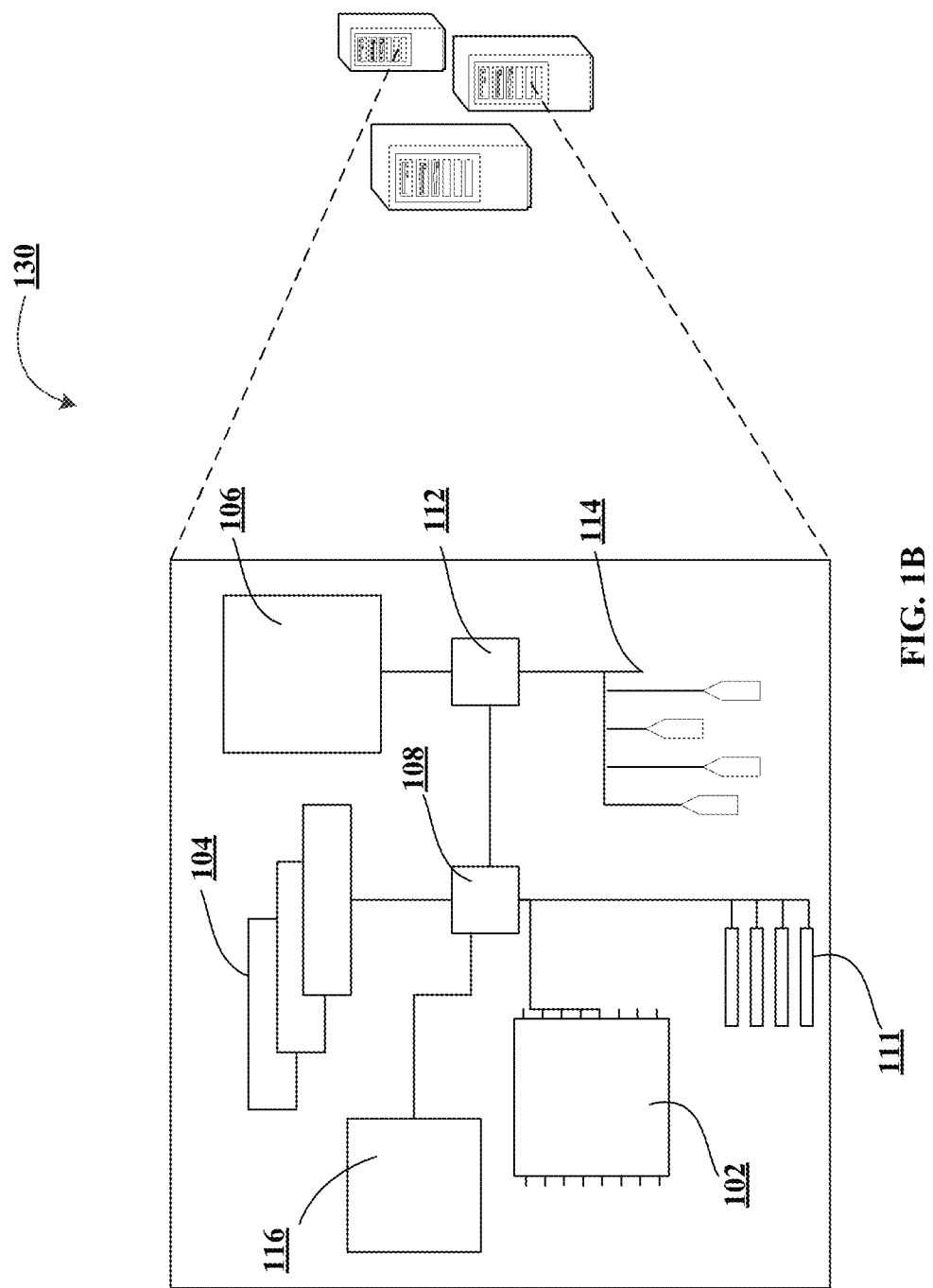
Figure 1C:
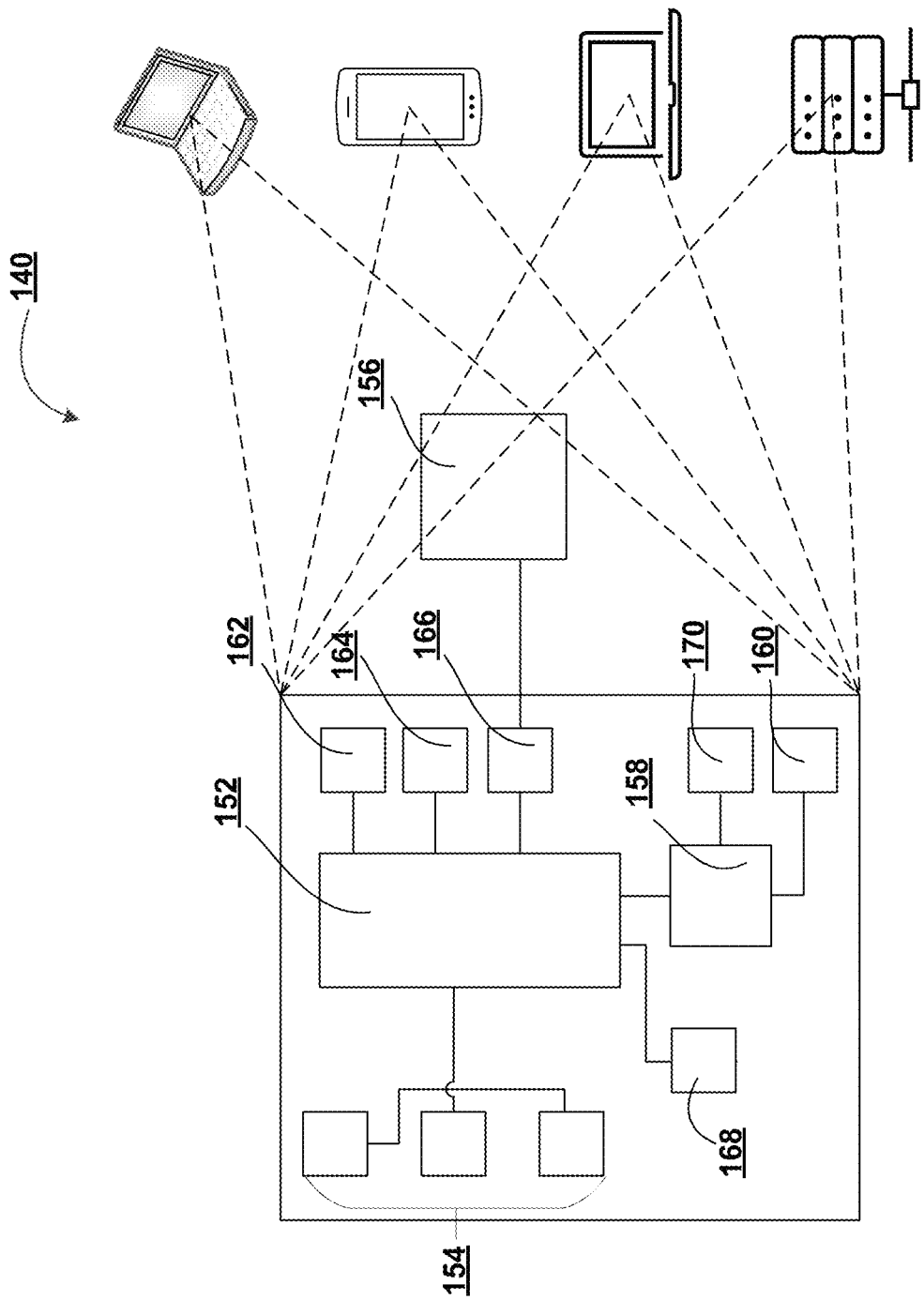
Figure 2A:
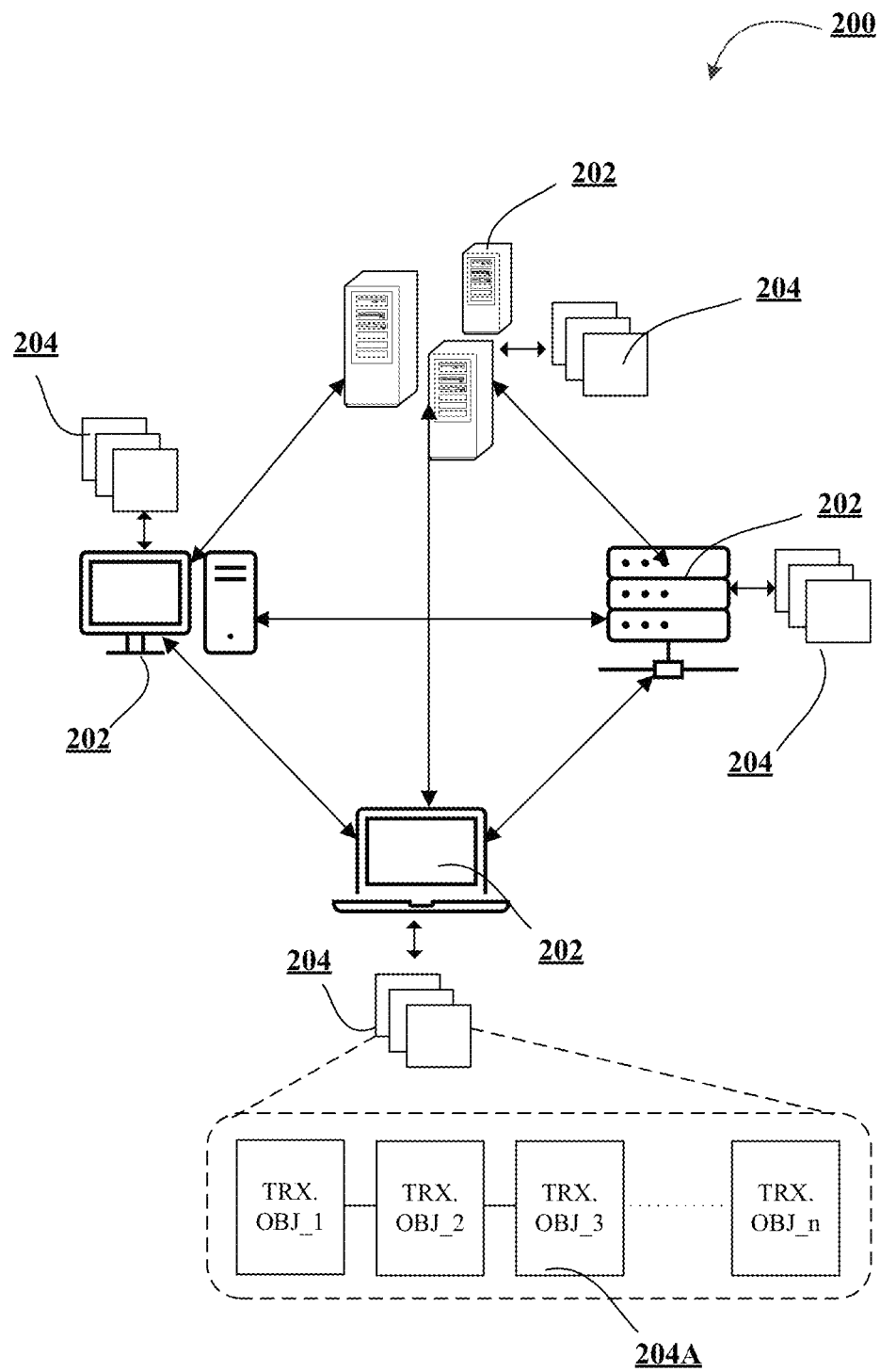
Figure 2B:
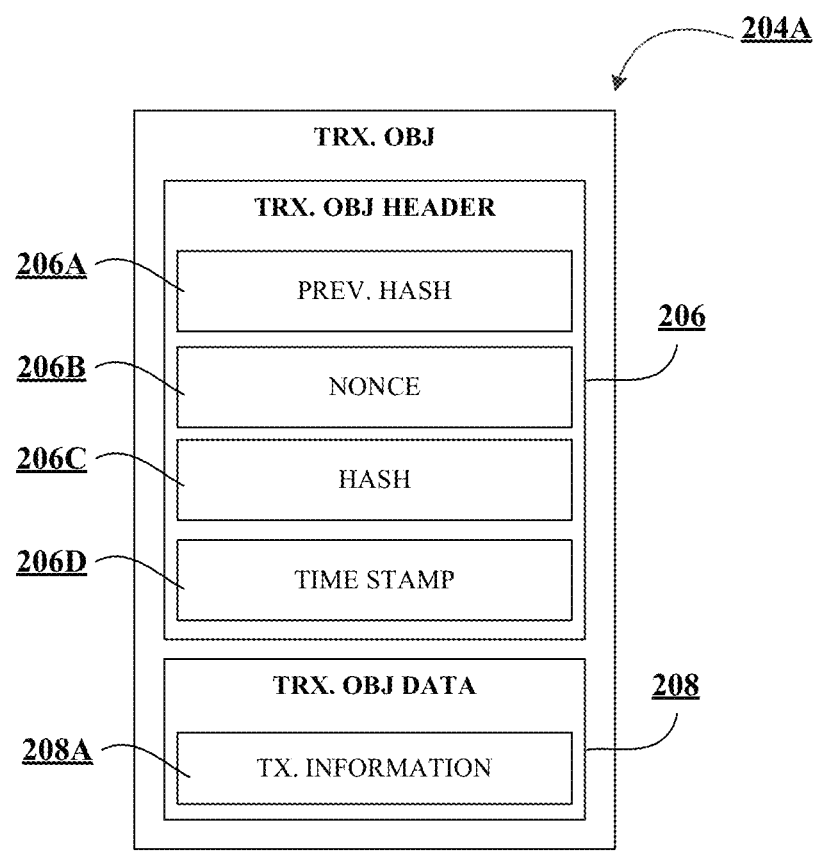
Figure 3B:
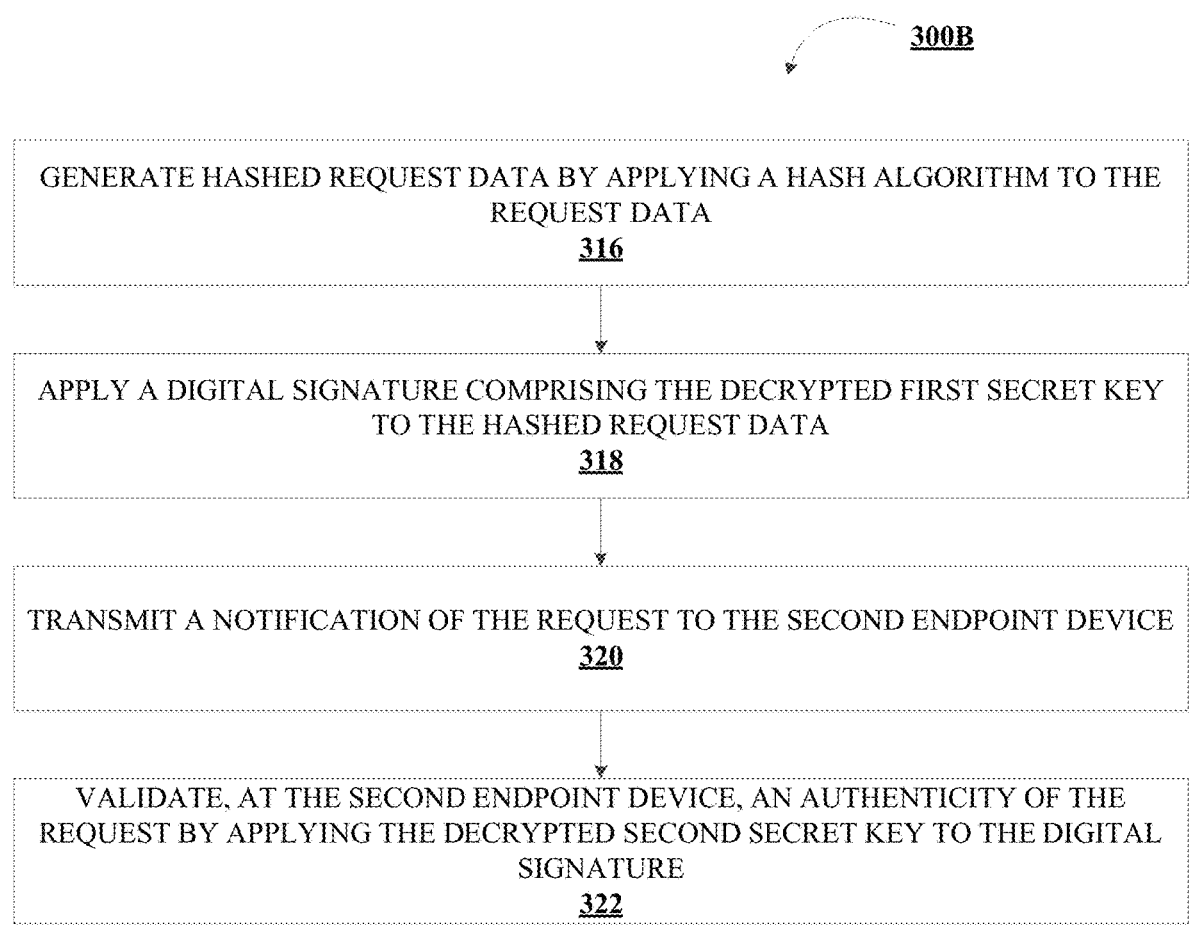
Figure 4:
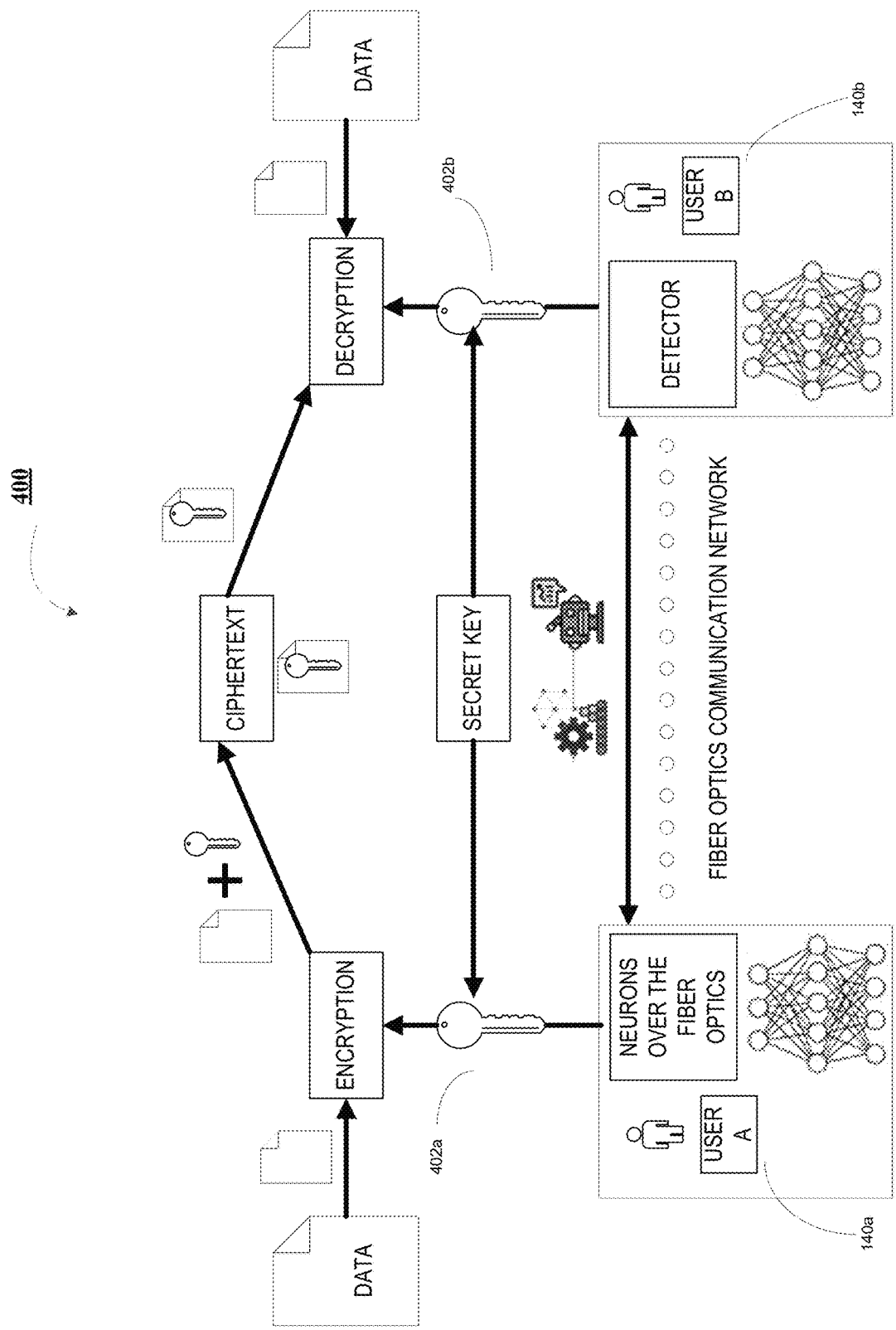
Figure 5:
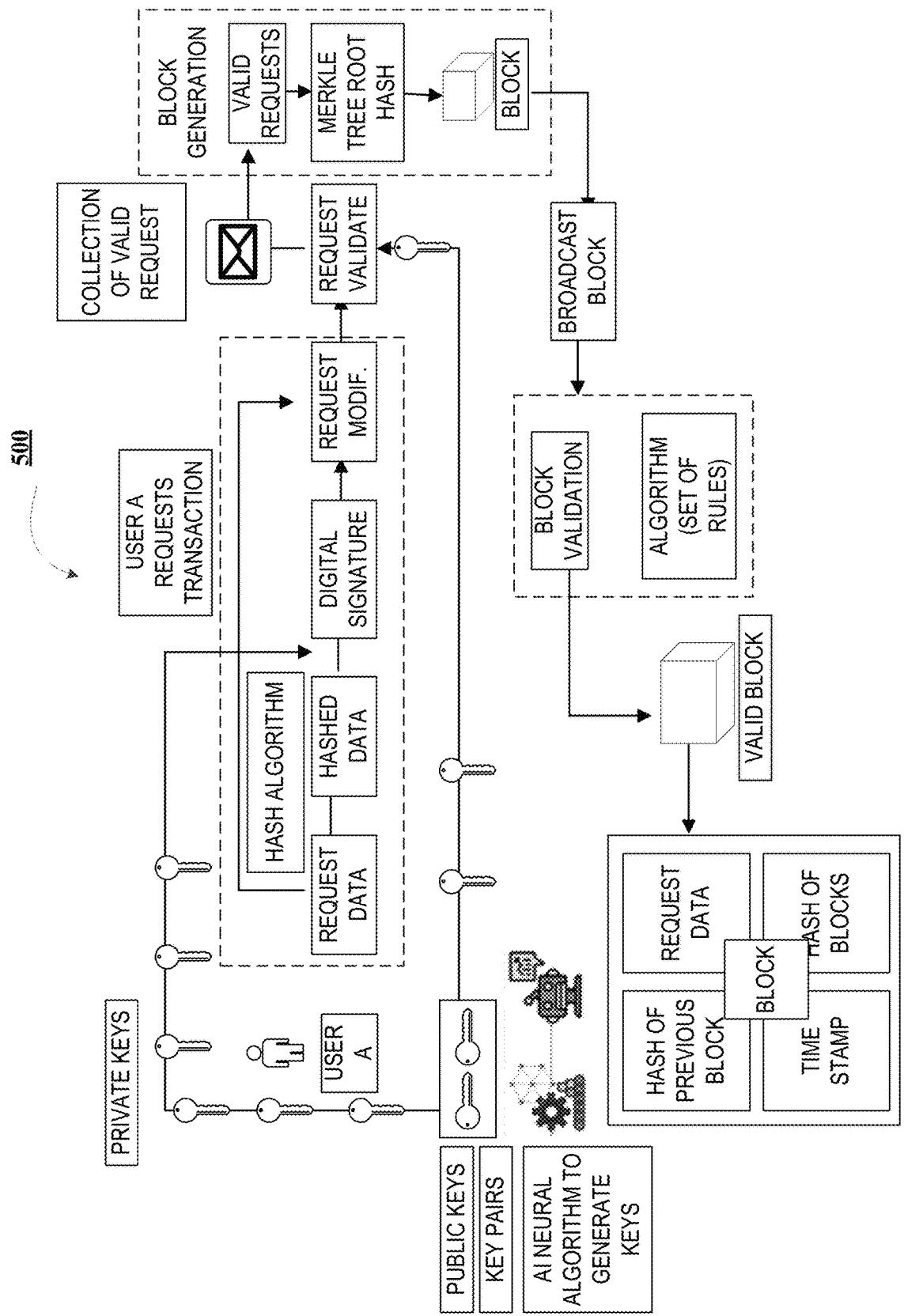

Having thus described embodiments of the invention in general terms, reference will now be made the accompanying drawings, wherein:

FIGS. 1A-1C illustrate technical components of an exemplary distributed computing environment for cryptographic data transfer and authentication in a distributed network, in accordance with an embodiment of the invention;

FIGS. 2A and 2B illustrate an exemplary distributed ledger technology (DLT) architecture, in accordance with an embodiment of the invention;

FIGS. 3A-3C illustrate a process flow for cryptographic data transfer and authentication in a distributed network, in accordance with an embodiment of the invention;

FIG. 4 illustrates an exemplary architecture structure for cryptographic data transfer and authentication in a distributed network, in accordance with an embodiment of the invention; and FIG. 5 illustrates an exemplary architecture structure for cryptographic data transfer and authentication in a distributed network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "interface" may be any device or software that allows a user to input information, such as commands or data, into a device, or that allows the device to output information to the user. For example, the interface includes a graphical user interface (GUI) or an interface to input computer-executable instructions that direct a processing device to carry out specific functions. The interface typically employs certain input and output devices to input data received from a user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "credentials" or "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" or "user interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, a transmission of a digital audio signal, or the like. As used herein, an "interacting user" may refer to a user who is engaging in the interaction, such as a caller to a helpdesk, a customer interacting with a digital assistant, or the like.

Before the invention described herein, the state of technology in addressing the secure generation and transfer of cryptographic keys within organizations was inadequate. The prevailing problem was the reliance on simplistic algorithms that may be easily thwarted by skilled malfeasant actors, leading to unauthorized access to systems of the organization. While some techniques existed for improving the security of the cryptographic key generation and transmission process, such as the compliance with key management standards and best practices including the implementation of hardware security modules (HSMs), the regular rotation of keys after an expiration date, or the like, the existing solutions lacked the ability to generate keys with a robust level of inherent security of keys requisite to manage, record, and transfer keys with minimal concerns regarding the security thereof.

The problem at hand necessitates finding a solution to address the gaps in generating and transferring keys between devices and accounts thereon within organizations. These gaps primarily arise from the ability of malfeasant actors to appropriate the algorithm used to generate keys, thereby presenting unfettered access to data not otherwise intended to be accessed. Therefore, there is an immediate need for an innovative solution that can intrinsically generate secure keys with higher security standards, and record the transmission thereof to trace the chains of custody of said keys.

The present disclosure reflects the discovery of a novel solution that uses neural network communication protocols and optical fiber networks to ensure that the keys are securely distributed, cloud storage to allow for the storage of a large number of keys, and distributed ledger technology to provide tamper-proof recording of the distribution of the keys. This technology enables the generation and flexible, secure, communication of neural network-based keys. By applying neural network algorithms and communication architecture through optical fiber optic networks, along with the recordation of key transfers on a distributed ledger, this system mitigates the vulnerabilities associated with sharing keys across an organization.

Specifically, the present disclosure introduces a system, computer program product, and method for cryptographic data transfer and authentication in a distributed network. The process begins with receiving a request containing request data to move data from one device to another. Then, two secret keys are generated using a neural network. These keys are symmetrical. The secret keys are distributed on a cloud server. The cloud server encrypts each key with a public key related to a corresponding endpoint device which is to receive the secret key. The encrypted secret keys are stored on the cloud server. Upon receiving a request from the sending device, an encrypted secret key is transferred to the sending device. The sending device decrypts the secret key using its private key. Upon receiving a request from the receiving device, the other encrypted secret key is transferred to the receiving device. The receiving device decrypts the secret key using its private key. A hash algorithm is applied to the request data, and a digital signature is applied to the hashed request data with the secret key of the sending device. The receiving device determines that a request was made, and the receiving device checks the digital signature with its own secret key to make sure the request is authentic. If the request is authentic, the data is organized into a Merkle tree configuration and a Merkle tree root hash is generated. A block containing the Merkle tree root hash is created, and the sending device secret key is used to encrypt the block. The encrypted block is broadcast to devices in the optical fiber network. The receiving device determines if the block is valid and not tampered with by calculating another Merkle tree root hash. If the block is valid, the receiving device uses its secret key to open the block and access the data inside.

What is more, the present invention provides a technical solution to a technical problem. As described herein, the technical problem includes inadequate technology to securely create, manage and distribute and transfer keys to/from various accounts and devices of an entity. The technical solution presented herein allows for the generating keys via a neural network, a cloud-based platform for storing and managing the keys, and a blockchain-based system for ensuring the integrity and authenticity of the keys. In particular, the system is an improvement over existing cryptographic key generation and communication systems by securely generating and transferring cryptographic keys (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment 100 for cryptographic data transfer and authentication in a distributed network, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 connecting to low speed bus 114 and storage device 106. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory engine) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIGS. 2A and 2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B-a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIGS. 3A-3C illustrate a process flow for cryptographic data transfer and authentication in a distributed network, in accordance with an embodiment of the invention.

Referring first to FIG. 3A, the process may begin as shown in block 302, where the system 130 receives request data for a request to transfer data from a first endpoint device 140a to a second endpoint device 140b. As used herein, "request data" may refer to the information and parameters associated with the initiation and execution of a data transfer request. This includes, but is not limited to, details regarding the sender (the first endpoint device 140a and/or any account associated with the first endpoint device 140*a*) and receiver (the second endpoint device 140*b* and/or any account associated with the second endpoint device 140*b*) endpoints, such as IP addresses, device identifiers, and authentication credentials. Additionally, "request data" may include metadata pertaining to the file or data packet being transferred, such as file size, type, timestamp, and encryption specifications. Furthermore, "request data" may also include any auxiliary instructions or flags that guide the transmission process, like prioritization, error handling preferences, and delivery acknowledgments. In essence, "request data" serves as a descriptor of the data transfer transaction, encapsulating essential information for both the sender and receiver to coordinate and complete the transfer operation.

In some embodiments, the system 130 may proceed to authenticate one or both endpoint devices 140*a*, 140*b* to ensure their legitimacy and authorization for the data transfer. This authentication step may include validating provided credentials, which could be usernames, passwords, or other forms of authentication such as digital certificates.

In some embodiments, the request data may be automatically generated as a result of a predetermined (e.g., pre-scheduled) data transfer. In other embodiments, the request data may be generated by the system 130 as a result of an activity undertaken by a user of the first endpoint device 140*a*. For example, a user may indicate and/or select on the first endpoint device 140*a* the location of one or more datasets, files, or the like. Thereafter, the user may indicate to the first endpoint device 140*a* the destination of the one or more datasets, files, or the like. Accordingly, the system 130 may then retrieve this information and generate corresponding request data. Alternatively, in some embodiments the request data may be provided to the system 130 by a user of the first endpoint device 140*a* manually entering the request data into a user interface of the first endpoint device 140*a*.

Next, at block 304, the system 130 may generate a first secret key and a second secret key via an artificial neural network engine, wherein the first secret key and the second secret key are symmetrical.

As used herein, an "artificial neural network engine" may refer to a computational system designed to simulate the information processing capabilities observed in biological neural networks. This artificial neural network engine encompasses a network of interconnected nodes, also known as artificial neurons, organized in layers to enable learning and pattern recognition tasks. By leveraging mathematical algorithms, particularly in the realm of machine learning and deep learning, the artificial neural network engine autonomously adapts its connections' strengths, known as weights, based on input data. This dynamic weight adjustment enables the network to generalize from the provided data and make predictions, classifications, or generate outputs without being explicitly programmed for each specific task.

The artificial neural network engine in the present system is trained to produce cryptographic keys. The artificial neural network engine takes into account various input parameters such as user-specific data, contextual information, or random seeds. By processing these inputs through its layers, the artificial neural network engine generates a pair of symmetrical secret keys.

Although the present disclosure refers to the transfer of files between a first endpoint device 140*a* and a second endpoint device 140*b*, in some embodiments of the system 130 the distributed network may include three or more endpoint devices. In such embodiments, the first endpoint device 140*a* may want to transfer data to a second and a third endpoint device. As such, not only will the second endpoint device 140*b* receive a secret key symmetrical with that of the first endpoint device 140*a*, but the third endpoint device will also receive a secret key symmetrical with that of the first endpoint device 140*a*.

In some embodiments, the input parameters into the artificial neural network may include a predetermined encryption level. For example, a communication platform utilized by a team collaborating on sensitive projects may assign each project a distinct encryption level during its setup phase, chosen based on the project's confidentiality requirements and the geographic locations of the team and the corresponding endpoint devices. In some embodiments, the encryption level may be predetermined based on a numerical scale from 1 to 10, where 10 indicates a requirement for high encryption levels, and 1 indicates a requirement for lower encryption levels.

In a high encryption level scheme, strong cryptographic algorithms are chosen to ensure the highest level of security. Advanced encryption algorithms like AES-256 (Advanced Encryption Standard with a 256-bit key) are utilized for both data at rest and data in transit. A medium encryption level approach balances security with performance and usability. It typically employs AES-128 or similar encryption algorithms for data protection. While not as robust as AES-256, AES-128 still offers a strong level of encryption and is computationally efficient. In this scheme, regular key rotation and periodic password updates are maintained to reduce the likelihood of prolonged exposure to a single key. Low encryption level schemes may include basic encryption methods like XOR or simple substitution ciphers.

In other words, lower encryption levels might facilitate seamless information exchange but with reduced data protection, while higher encryption levels would guarantee heightened security at the expense of potential communication delays. As a result, the neural network incorporates the chosen encryption protocols into the generation of the secret keys.

Additionally, or alternatively, in some embodiments, the input parameters into the artificial neural network may include a hash index of a previous secret key. By including a hash index derived from pre-existing secret key(s) of the cryptography system 130 as an input to the system 130 increased security of the newly generated secret key(s) by leveraging the cryptographic strength of the original key(s) and mitigates any potential breaches during the key generation process. The hash index serves as a controlled intermediary between the old and new secret key(s) and enhances computational efficiency, since hash functions allow for quick processing of data (here, secret keys).

Continuing at block 306, after the artificial neural network generates the secret keys, the system 130 distributes the first secret key and the second secret key via a cloud server such as to securely transmit the secret keys to authorized users or applications over a network, and to ensure that only designated recipients can access and utilize these keys for encryption, decryption, or authentication purposes. The cloud server is also scalable, such that fluctuations in demand and usage interact with auto-scaling capabilities of the cloud server to increase or decrease capacity accordingly.

Prior to distribution, in some embodiments the cloud server may encrypt the first secret key with a first public key associated with the first endpoint device 140*a* to generate an encrypted first secret key. Similarly, the cloud server may encrypt the second secret key with a second public key associated with the second endpoint device 140*b* to generate an encrypted second secret key.

As will be understood in view of the present disclosure, such an asymmetric encryption process ensures that only the corresponding private key held by the intended endpoint device can decrypt and access the first secret key. This prevents unauthorized access or tampering with sensitive cryptographic material during transit and storage. It also ensures that while the encrypted secret key can be securely transmitted through potentially insecure channels, the decryption process remains exclusive to the endpoint device in which the secret key is intended to be disseminated.

In some embodiments, the public keys associated with the first endpoint device 140a and the second endpoint device 140b may be provided to the cloud server prior to the generation of the first and second secret keys. In other embodiments, the public keys associated with the first endpoint device 140a and the second endpoint device 140b may be provided to the cloud server after the generation of the first and second secret keys.

As a result of encrypting the first secret key and the second secret key (or each secret key generated), the cloud server of the system 130 has thereby generated an encrypted first secret key and an encrypted second secret key. Once encrypted, in some embodiments, the ciphertext of both keys may be sent to the cloud server for storage. Prior to transmission, secure communication protocols such as Transport Layer Security (TLS) may establish a secure channel between the server and endpoint device(s).

It shall be appreciated that the first endpoint device 140a and the second endpoint device 140b are nodes of a distributed network. In some embodiments, the distributed network comprises an optical fiber network. Given the characteristics of optical fibers, optical fiber networks eschew emitting electromagnetic signals that can be intercepted, thereby mitigating the likelihood of data breaches. In other embodiments, the distributed network might be established through wireless communication protocols such as Wi-Fi, cellular networks, or satellite links. In yet additional embodiments, the distributed network might incorporate a combination of wired (including optical fibers) and wireless technologies.

Continuing at block 308, the system 130 may store the encrypted first secret key and the encrypted second secret key in the cloud server. Upon arrival at the cloud server, the encrypted first and second secret keys are stored in a secure and controlled environment of the cloud server. In some embodiments, the cloud server may provide additional layers of security like firewalls, intrusion detection systems, and access controls. In some embodiments, the encrypted first and second keys may be associated with specific endpoint devices or user accounts, and proper access controls ensure that only authorized users can retrieve or manipulate the encrypted keys.

At block 310, the system 130 may transmit, in response to a request from the first endpoint device 140a, the encrypted first secret key to the first endpoint device 140a. When a request for transmitting the first secret key to the first endpoint device 140a is made by a user associated with the first endpoint device 140a, or as the result of an automated and scheduled data transfer, the encrypted first secret key is transferred to the first endpoint device 140a and may be decrypted upon receipt by the first endpoint device 140a. The decryption process reverses the encryption, such that the secret key may then be used for various cryptographic processes described herein, including but not limited to, digital signatures, or authentication.

Accordingly, the first endpoint device 140a obtains a decrypted first secret key from the encrypted first secret key by applying a first private key associated with the first public key. By applying the private key to the encrypted first secret key, the first endpoint device 140a effectively "unlocks" the encrypted data (here, the first secret key), revealing the original information that was protected using the encryption process. Such asymmetric cryptographic approaches ensures only authorized endpoint devices or accounts possessing the corresponding private key can decrypt and access the first secret key.

In the same manner as illustrated in block 310 regarding the first secret key and the first endpoint device 140a, at block 312 the system 130 may transmit, in response to a request for transmitting the second secret key to the second endpoint device 140b is made by a user associated with the second endpoint device 140b, or as the result of an automated and scheduled data transfer, the encrypted second secret key is transferred to the second endpoint device 140b and may be decrypted upon receipt by the second endpoint device 140b by using the private key associated with the second endpoint device 140b (the second private key).

Referring now to FIG. 3B, at block 316, the system 130 may generate hashed request data by applying a hash algorithm to the request data. The hash algorithm takes the entirety of the request data as input and produces a fixed-length string of characters, which is the hash value. This value is unique to the input request data, meaning even a small change in the request data results in a significantly different hash value. Various hash algorithms may be used, including MD5 (Message Digest Algorithm 5) which produces a 128-bit hash value; SHA-1 (Secure Hash Algorithm 1) generating a 160-bit hash value; and SHA-256 (Secure Hash Algorithm 256-bit) which offers a 256-bit hash value, SHA-3, BLAKE2, Whirlpool, RIPEMD, or HMAC (Hash-based Message Authentication Code).

Next, at block 318, the system 130 may use a symmetric cryptographic technique to apply a digital signature to the hashed request data. This digital signature may incorporate the decrypted first secret key, which corresponds to the sender (the first endpoint device 140a). A message authentication code (MAC) or hash of the hashed request data is generated using the decrypted first secret key such that both the sender (the first endpoint device 140a) and the recipient (the second endpoint device 140b, which is in possession of the second secret key symmetrical to the first secret key) are able to access the hashed request data. This encrypted MAC forms the digital signature. During verification, as will be described in detail with respect to block 322, the second endpoint device 140b uses the second secret key to decrypt the MAC from the digital signature and then compares it to a locally computed MAC of the received hashed request data. If they match, the integrity and authenticity of the hashed request data are confirmed, as any tampering would lead to a mismatch between the computed and decrypted MACs.

Next, at block 320, the system 130 may transmit a notification (of the request for data transfer) to the second endpoint device 140b. The system 130 generates a message or packet containing relevant information about the data transfer request. The notification can include the hashed request data, the digital signature, and any additional communication details. Moreover, the hashed request data may include a reference to the data to be transferred, such as the location and/or name(s) of the file(s). To ensure secure transmission, the message may be encapsulated within a secure transport layer, such as TLS (Transport Layer Security), which establishes an encrypted connection between the sender and receiver. Additionally, the notification may be addressed to the specific IP address or network location associated with the second endpoint device 140*b*. Once the message reaches the second endpoint device 140*b*, it can proceed to the validation process as illustrated in block 322.

In some embodiments, the notification may contain features such as selection icons to allow for a user associated with the first endpoint device 140*a* and/or the second endpoint device 140*b* to approve or deny the request for data transfer. Upon selection of the "deny" icon, the data transfer is terminated, and the process ends. However, upon selection of the "approve" icon, the data transfer may continue at block 322.

At block 322, the system 130 validates, at the second endpoint device 140*b*, an authenticity of the request by applying the decrypted second secret key to the digital signature. The digital signature is decrypted with the decrypted second secret key. The hashed request data is then used to confirm the integrity of the transmitted information. If both the digital signature and hashed request data validation succeed, the second endpoint device 140*b* can proceed with processing the data transfer, confident in its authenticity and security.

Referring now to FIG. 3C, at block 324, the system 130 may organize the data, as a result of validating the authenticity of the request, into a Merkle tree configuration. Once the request to transfer data has been authenticated, the second endpoint device 140*b* is thereby declaring its receptiveness to receiving the data that is being transferred from the first endpoint device 140*a*. Prior to transferring the data, to ensure data validity throughout the transfer of said data, the system 130 first transforms the data into a Merkle tree. As used herein, a "Merkle tree" refers to a cryptographic data structure that enables efficient verification of the contents of large datasets. The Merkle tree breaks down the data into smaller segments, known as "leaves," and then hashes pairs of leaves to generate successive layers of hashes, culminating in a single root hash referred to as the "Merkle root." This root hash summarizes the entire dataset's contents and provides a mechanism for both parties to verify the integrity of the transmitted data. By comparing a subset of hashes with the known Merkle root, the receiving device can identify any inconsistencies or tampering that might have occurred during transmission.

At block 326, the system 130 determines a first Merkle tree root hash of the data. This is achieved through a process that involves dividing the data into fixed-size blocks or chunks. Each chunk is then individually hashed using a cryptographic hash function, such as, but not limited to, SHA-256. The resulting hashes are paired, and each pair is hashed together again to create a new layer of hashes, known as "intermediate hashes." This process continues until only a single hash remains, which is the first Merkle tree root hash.

For example, the data may consist of four blocks: A, B, C, and D. The hash of each individual block would be calculated: hash (A), hash (B), hash (C), and hash (D). These individual hashes are then paired and hashed in pairs: hash (hash (A)+hash (B)) and hash (hash (C)+hash (D)). Finally, these two intermediate hashes are combined by hashing them together: hash (hash (hash (A)+hash (B))+hash (hash (C)+hash (D))). The resulting hash represents the first Merkle tree root hash, which serves as a concise and secure representation of the entire dataset.

Next, at block 328, the system 130 may generate a block comprising the first Merkle tree root hash. The new block is assigned a distinct label for identification and a timestamp to note when it was created. It may also include a reference to the previous block's unique code, the request data, and so forth.

At block 330, the system 130 secures the block using the decrypted first secret key, such that only the holder of the decrypted first secret key and the decrypted second secret key are able to resolve the contents of the block. Then, at block 332, the system 130 broadcasts the block to the nodes of the distributed network. As previously expressed, the first and second endpoint devices 140*a*, 140*b* are nodes of the distributed network. In some embodiments, the only nodes of the distributed network are the first and second endpoint devices 140*a*, 140*b*.

At block 334, the system 130 may then validate the block at the second endpoint device 140*b* of the distributed network. After the initial encryption and security measures have been applied to the block at the first endpoint device 140*a*, the system 130 proceeds to ensure the integrity of the data during its journey through the distributed network. This verification process takes place at the second endpoint device 140*b*, where another layer of validation is performed to confirm the block's authenticity.

The validation procedure may include computing a second Merkle tree root hash of the data within the block. At the second endpoint device 140*b*, the individual data elements within the block are hashed, and these hashes are combined in a hierarchical manner to form the second Merkle tree root hash. By comparing this newly calculated hash to the original first Merkle tree root hash that was generated at the block's inception, the system 130 at the second endpoint device 140*b* determines whether the block has remained uncompromised (e.g., unchanged) during its transmission through the distributed network. If the second Merkle tree root hash matches the first Merkle tree root hash, it signifies that the data within the block has not been altered or tampered with along the way. However, if there are any discrepancies between the two hash values, it indicates a potential compromise of the block's contents.

In some embodiments, a notification may be transmitted to the first endpoint device 140*a* if the system 130 determines that the block's contents were compromised. Additionally, or alternatively, in some embodiments a notification may be transmitted to the second endpoint device 140*b* if the system 130 determines that the block's contents were compromised. The notification may include information about the potential data compromise, recommended actions to mitigate the compromise, and/or instructions for verifying the integrity of the affected block's contents. Additionally, or alternatively, the notification could contain details regarding the date and time of the detected compromise, as well as any relevant logs or traces of the unauthorized access.

In some embodiments, the notification may be an alphanumeric message and/or a graphical image containing alphanumeric data, each of which is displayed graphically on a graphical user interface of an endpoint device. In some embodiments, the notification may be routed to email or SMS text message services to provide alternate methods of communicating the notification to one or more users associated with the endpoint device.

At block 336, the system 130 may decrypt, in response to validating the block, the data of the block using the decrypted second secret key. The decryption may occur at the second endpoint device 140*b* in order for the second endpoint device 140*b* to view and/or store the data associated with the transfer of data. In other words, the system 130 uses the stored second secret key, known only to the recipient, to decrypt the encrypted data within the block. The decrypted data then becomes accessible to the second endpoint device 140b, such as to facilitate the viewing, processing, and interacting with the content that was originally encrypted.

FIGS. 4 and 5 illustrate exemplary architecture structures for cryptographic data transfer and authentication in a distributed network, in accordance with embodiments of the invention. As shown in FIG. 4, first and second secret keys 402a, 402b are generated and distributed to the first endpoint device 140a and the second endpoint device 140b, as corresponding with block 302 thru block 314 of FIG. 3A. As shown in FIG. 5, public and private keys are used in an asymmetrical cryptography scheme to secure the communication of data alongside the secure transfer of the symmetrical private key pairs to retrieve the data, as corresponding with blocks 314 thru 336 of FIGS. 3A and 3B.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator—and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for cryptographic data transfer and authentication in a distributed network, the system comprising:
   a processing device; and
   a non-transitory storage device comprising instructions that, when executed by the processing device, causes the processing device to perform the steps of:
      receive request data for a request to transfer data from a first endpoint device to a second endpoint device;
      generate a first secret key and a second secret key via an artificial neural network engine, wherein the first secret key and the second secret key are symmetrical;
      distribute the first secret key and the second secret key via a cloud server, wherein the cloud server encrypts the first secret key with a first public key associated with the first endpoint device to generate an encrypted first secret key, and wherein the cloud server encrypts the second secret key with a second public key associated with the second endpoint device to generate an encrypted second secret key, wherein the first endpoint device and the second endpoint device are nodes of a distributed network;
      store the encrypted first secret key and the encrypted second secret key in the cloud server;
      transmit, in response to a request from the first endpoint device, the encrypted first secret key to the first endpoint device, wherein the first endpoint device obtains a decrypted first secret key from the encrypted first secret key by applying a first private key associated with the first public key; and
      transmit, in response to a request from the second endpoint device, the encrypted second secret key to the first endpoint device, wherein the second endpoint device obtains a decrypted second secret key from the encrypted second secret key by applying a second private key associated with the second public key.

2. The system of claim 1, wherein the instructions further cause the processing device to:
   generate hashed request data by applying a hash algorithm to the request data;
   apply a digital signature comprising the decrypted first secret key to the hashed request data;
   transmit a notification of the request to the second endpoint device; and
   validate, at the second endpoint device, an authenticity of the request by applying the decrypted second secret key to the digital signature.

3. The system of claim 2, wherein the instructions further cause the processing device to:
   organize the data, as a result of validating the authenticity of the request, in a Merkle tree;
   determine a first Merkle tree root hash of the data;
   generate a block comprising the first Merkle tree root hash;
   secure the block using the decrypted first secret key;
   broadcast the block to the nodes of the distributed network;
   validate the block at the second endpoint device of the distributed network; and
   decrypt, in response to validating the block, the data of the block using the decrypted second secret key.

4. The system of claim 1, wherein generating the first secret key and the second secret key via the artificial neural network engine comprises the artificial neural network engine outputting the first secret key and the second secret key based on a predetermined encryption level.

5. The system of claim 1, wherein generating the first secret key and the second secret key via the artificial neural network engine comprises the artificial neural network engine outputting the first secret key and the second secret key based on a hash index of a previous secret key.

6. The system of claim 3, wherein validating the block comprises the second endpoint device determining a second Merkle tree root hash of the data, and wherein the block is verified if the second Merkle tree root hash is identical to the first Merkle tree root hash.

7. The system of claim 1, wherein the distributed network comprises an optical fiber network.

8. A computer program product for cryptographic data transfer and authentication in a distributed network, the computer program product comprising a non-transitory computer-readable medium comprising code causing an apparatus to:
   receive request data for a request to transfer data from a first endpoint device to a second endpoint device;
   generate a first secret key and a second secret key via an artificial neural network engine, wherein the first secret key and the second secret key are symmetrical;
   distribute the first secret key and the second secret key via a cloud server, wherein the cloud server encrypts the first secret key with a first public key associated with the first endpoint device to generate an encrypted first secret key, and wherein the cloud server encrypts the second secret key with a second public key associated with the second endpoint device to generate an encrypted second secret key, wherein the first endpoint device and the second endpoint device are nodes of a distributed network;
   store the encrypted first secret key and the encrypted second secret key in the cloud server;
   transmit, in response to a request from the first endpoint device, the encrypted first secret key to the first endpoint device, wherein the first endpoint device obtains a decrypted first secret key from the encrypted first secret key by applying a first private key associated with the first public key; and
   transmit, in response to a request from the second endpoint device, the encrypted second secret key to the first endpoint device, wherein the second endpoint device obtains a decrypted second secret key from the encrypted second secret key by applying a second private key associated with the second public key.

9. The computer program product of claim 8, wherein the code further causes the apparatus to:
   generate hashed request data by applying a hash algorithm to the request data;
   apply a digital signature comprising the decrypted first secret key to the hashed request data;

transmit a notification of the request to the second endpoint device; and validate, at the second endpoint device, an authenticity of the request by applying the decrypted second secret key to the digital signature.

10. The computer program product of claim 9, wherein the code further causes the apparatus to:

organize the data, as a result of validating the authenticity of the request, in a Merkle tree;

determine a first Merkle tree root hash of the data;

generate a block comprising the first Merkle tree root hash;

secure the block using the decrypted first secret key;

broadcast the block to the nodes of the distributed network;

validate the block at the second endpoint device of the distributed network, wherein validating the block comprises the second endpoint device determining a second Merkle tree root hash of the data, and wherein the block is verified if the second Merkle tree root hash is identical to the first Merkle tree root hash; and decrypt, in response to validating the block, the data of the block using the decrypted second secret key.

11. The computer program product of claim 8, wherein generating the first secret key and the second secret key via the artificial neural network engine comprises the artificial neural network engine outputting the first secret key and the second secret key based on a predetermined encryption level.

12. The computer program product of claim 8, wherein generating the first secret key and the second secret key via the artificial neural network engine comprises the artificial neural network engine outputting the first secret key and the second secret key based on a hash index of a previous secret key.

13. The computer program product of claim 10, wherein validating the block comprises the second endpoint device determining a second Merkle tree root hash of the data, and wherein the block is verified if the second Merkle tree root hash is identical to the first Merkle tree root hash.

14. The computer program product of claim 8, wherein the distributed network comprises an optical fiber network.

15. A method for cryptographic data transfer and authentication in a distributed network, the method comprising:

receiving request data for a request to transfer data from a first endpoint device to a second endpoint device;

generating a first secret key and a second secret key via an artificial neural network engine, wherein the first secret key and the second secret key are symmetrical;

distributing the first secret key and the second secret key via a cloud server, wherein the cloud server encrypts the first secret key with a first public key associated with the first endpoint device to generate an encrypted first secret key, and wherein the cloud server encrypts the second secret key with a second public key associated with the second endpoint device to generate an encrypted second secret key, wherein the first endpoint device and the second endpoint device are nodes of a distributed network;

storing the encrypted first secret key and the encrypted second secret key in the cloud server;

transmitting, in response to a request from the first endpoint device, the encrypted first secret key to the first endpoint device, wherein the first endpoint device obtains a decrypted first secret key from the encrypted first secret key by applying a first private key associated with the first public key; and transmitting, in response to a request from the second endpoint device, the encrypted second secret key to the first endpoint device, wherein the second endpoint device obtains a decrypted second secret key from the encrypted second secret key by applying a second private key associated with the second public key.

16. The method of claim 15, wherein the method further comprises:

generating hashed request data by applying a hash algorithm to the request data;

applying a digital signature comprising the decrypted first secret key to the hashed request data;

transmitting a notification of the request to the second endpoint device; and validating, at the second endpoint device, an authenticity of the request by applying the decrypted second secret key to the digital signature.

17. The method of claim 16, wherein the method further comprises:

organizing the data, as a result of validating the authenticity of the request, in a Merkle tree;

determining a first Merkle tree root hash of the data;

generating a block comprising the first Merkle tree root hash;

securing the block using the decrypted first secret key;

broadcasting the block to the nodes of the distributed network;

validating the block at the second endpoint device of the distributed network, wherein validating the block comprises the second endpoint device determining a second Merkle tree root hash of the data, and wherein the block is verified if the second Merkle tree root hash is identical to the first Merkle tree root hash; and decrypting, in response to validating the block, the data of the block using the decrypted second secret key.

18. The method of claim 15, wherein generating the first secret key and the second secret key via the artificial neural network engine comprises the artificial neural network engine outputting the first secret key and the second secret key based on a predetermined encryption level.

19. The method of claim 15, wherein generating the first secret key and the second secret key via the artificial neural network engine comprises the artificial neural network engine outputting the first secret key and the second secret key based on a hash index of a previous secret key.

20. The method of claim 17, wherein validating the block comprises the second endpoint device determining a second Merkle tree root hash of the data, and wherein the block is verified if the second Merkle tree root hash is identical to the first Merkle tree root hash.

* * * * *